United States Patent [19]

Yokozawa et al.

[11] 4,392,219

[45] Jul. 5, 1983

[54] METHOD AND DEVICE FOR RECORDING AND REPRODUCING TRACKING INFORMATION

[75] Inventors: Norio Yokozawa, Fuchu; Wasao Takasugi, Higashiyamato; Seiji Yonezawa, Hachioji; Kiichi Ueyanagi, Kokubunji, all of Japan

[73] Assignee: Hitachi, Ltd., Tokyo, Japan

[21] Appl. No.: 252,593

[22] Filed: Apr. 9, 1981

Related U.S. Application Data

[63] Continuation of Ser. No. 43,749, May 30, 1979, abandoned.

[30] Foreign Application Priority Data

Jun. 9, 1978 [JP] Japan .................................. 53-68793

[51] Int. Cl.³ .............................................. G11B 21/10
[52] U.S. Cl. ........................................ 369/44; 369/50; 369/111; 369/275; 369/277; 360/77; 250/202; 318/577
[58] Field of Search ..................... 369/44, 43, 111, 47, 369/277, 278, 279, 275, 50; 360/77; 250/202; 318/577

[56] References Cited

U.S. PATENT DOCUMENTS

| | | | |
|---|---|---|---|
| 3,931,460 | 1/1976 | Watson | 369/44 |
| 3,985,952 | 10/1976 | Adler | 369/44 |
| 4,067,044 | 1/1978 | Maeda | 360/77 |
| 4,223,187 | 9/1980 | Yonezawa | 369/111 |
| 4,223,347 | 9/1980 | Bouwhuis | 369/44 |

*Primary Examiner*—Alan Faber
*Attorney, Agent, or Firm*—Antonelli, Terry & Wands

[57] ABSTRACT

A method for recording and reproducing information characterized in that an information train in which synchronizing signals are arrayed at equal time intervals between information signals is recorded in an information track on a recording medium which is wobbled in synchronism with the synchronizing signals and at a frequency integral times the frequency of the synchronizing signals, that the information train recorded in the information track is read out by read-out means, and that a position of the read-out means is controlled on the basis of the information train read out. The wobbling waveform is 90° out of phase with a harmonic component of the synchronizing signals.

10 Claims, 10 Drawing Figures

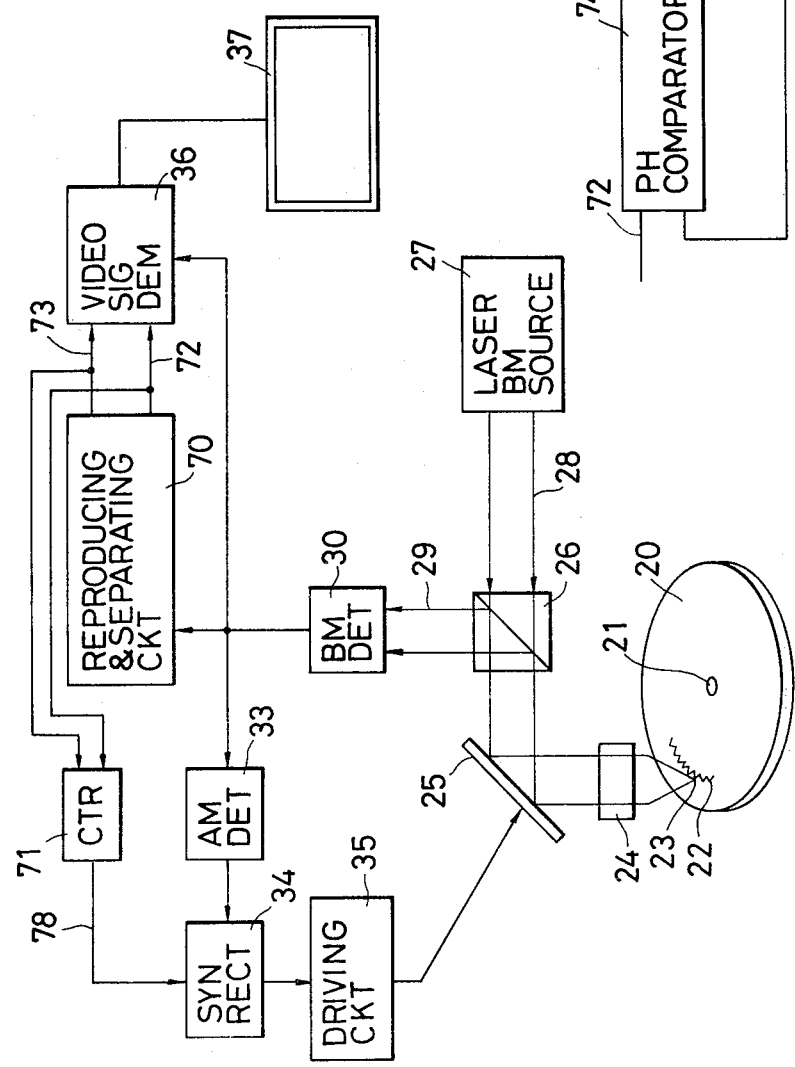
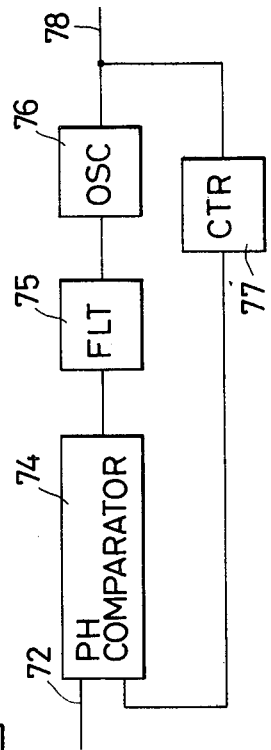
FIG. 9
FIG. 10

METHOD AND DEVICE FOR RECORDING AND REPRODUCING TRACKING INFORMATION

This is a continuation of application Ser. No. 043,749, filed May 30, 1979, now abandoned.

BACKGROUND OF THE INVENTION

This invention relates to a method and device for recording and reproducing information such as video signals and audio signals.

In recent years, an information recording and reproducing method has been known wherein information is recorded in a spiral track by applying onto a disk type recording medium a light beam, such as a laser beam, modulated by the video signals or audio signals and wherein while pursuing such recorded information track with a read-out sensor, the information on the track is read out in a non-contact manner.

In this case, whether the information to be recorded on the disk type recording medium is a video signal or an audio signal, it is represented by a pulse train subjected to an appropriate modulation, such as frequency modulation (FM), pulse width modulation (PWM) or pulse code modulation (PCM). The information is recorded on the information track so as to be readable with optical means in such a way that the recording medium has its surface made uneven or its reflection factor varied in correspondence with the "1" and "0" values of the encoded data.

The information is recorded in a spiral information track around the center of rotation of the recording medium. In this regard, usually the center of rotation during reproduction somewhat deviates from that during recording on account of a working error between the axis of rotation and the mounting hole of the recording medium. In particular, in the case of reading out the information from a replica which has been obtained by subjecting the recording medium to suitable processing, the deviation of the centers of rotation can reach approximately 100 [$\mu$m]. Therefore, the radius of the information track on the replica deviates sinusoidally at an amplitude of $\pm 100$ [$\mu$m] every revolution of the replica. Assuming that the width of the information track is about 1 [$\mu$m] and that the recording density of the information tracks in the radial direction of the recording medium is about 2 [$\mu$m], as many information tracks as 100 odd tracks move due to the deviation of the centers of rotation. It is accordingly indispensable to the accurate read-out of the information to control the position of the read-out sensor so that the information track may always come to the center of the visual field of the read-out sensor.

In general, in the read-out sensor, the amplitude of the reproduced information thereby obtained becomes a maximum when the sensor position coincides with the center of the information track, and it becomes smaller as the sensor position is more distant from the information track. Merely by detecting such reproduced information, however, it is difficult to discriminate the direction in which the read-out sensor has deviated with respect to the center of the information track.

There has accordingly been hitherto proposed and known a method wherein recording is made with only a synchronizing signal part of the information track set off, and an output corresponding to the direction of deviation of the read-out sensor from the information track is thus provided, whereby the sensor position can be controlled with the output. According to such prior-art method, however, a signal indicative of the polarity or phase of the offset (hereinbelow, termed "reference signal") needs to be contained in the information in the recording. This brings about such problems that a demodulator circuit for the reference signal is required in the reproduction apparatus and that the information density of the recording medium increases to render the precision condition of the playback apparatus more severe.

SUMMARY OF THE INVENTION

An object of this invention is to provide a method and device for recording and reproducing information in which with a very inexpensive construction, the position of a read-out sensor is caused to stably and precisely follow the center of an information track, thereby making it possible to obtain the maximum reproduced output.

In order to accomplish such object, according to this invention, in recording an information train on an information track, the information track is wobbled in a direction orthogonal thereto in synchronism with synchronizing signals arranged at equal time intervals in the information train and at a frequency which is an integral times higher than the synchronizing frequency and is different in phase by 90° from a harmonic component of the synchronizing signals.

BRIEF DESCRIPTION OF THE DRAWINGS

FIGS. 8 and 9 are block diagrams of embodiments of information recording apparatus and information playback apparatus which realize the information recording and reproducing method according to this invention, respectively; and FIG. 10 is a block diagram of another embodiment of a reference signal generating portion in FIG. 9.

DETAILED DESCRIPTION OF THE PRIOR ART

Figure 1:
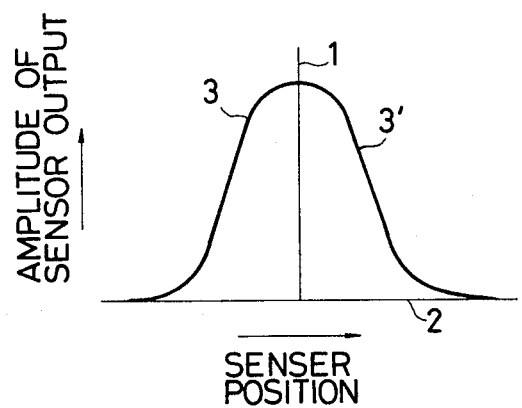
FIG. 1 is a characteristic diagram showing the relationship between the position and output of a read-out sensor.
Figure 2:
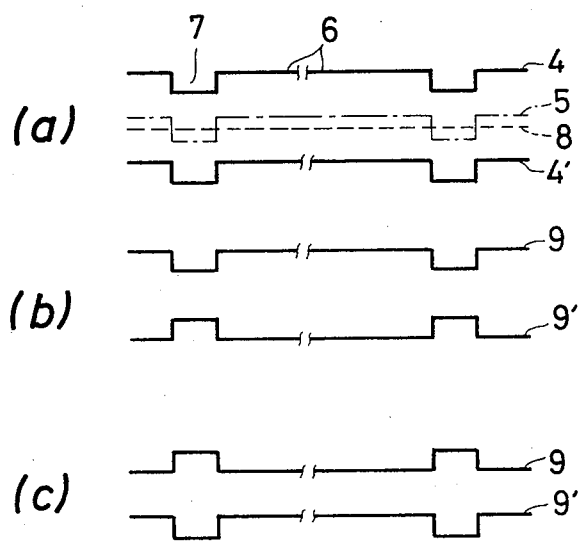
FIGS. 2(a) through (c) and 3(a) through (c) are diagrams for explaining prior-art methods for recording and reproducing information.

In general, in a read-out sensor to which this invention is directed, the relationship between the amplitude of the reproduced information obtained therefrom and the position thereof in a direction orthogonally intersecting with an information track presents a characteristic as shown in FIG. 1. The ordinate 1 indicates the output amplitude of the read-out sensor, while the abscissa 2 indicates the position of the read-out sensor. Here, the position of the ordinate 1 corresponds to a case where the read-out sensor lies at the center of the information track, and the sensor output becomes a maximum at that time. As the position of the read-out sensor becomes more distant from the center of the information track, the output of the read-out sensor lessens as indicated by the curve 3 or 3'. However, to whichever side the sensor moves from the center of the track, the polarity is the same. With only the output amplitude, therefore, it cannot be decided to which side the read-out sensor deviates from the center of the information track. Now, before explaining this invention, examples of prior-art methods for recording and reproducing information as contrived for the control of the sensor position will be described hereunder. FIG. 2 illustrates such an example. (a) in FIG. 2 shows a recording track directed towards video signals, and (b) and (c) in the figure show envelopes of read-out sensor outputs.

(a) in FIG. 2 is a diagram which shows the shape of the information track in a model-like fashion. In the diagram, a portion lying between positions 4 and 4' is the track, and numeral 5 indicates the center line of the track. Periods indicated by numerals 6 and 7 are a period for video signals of one horizontal scanning line and a period for a horizontal synchronizing signal, respectively. The feature of this example is that the track part of the horizontal synchronizing signal period 7 is recorded in the state under which it is set off or shifted relative to the track part of the video signal period 6. Numeral 8 indicates the average position between the central position of the track part of the video signal period and the central position of the track part of the horizontal synchronizing signal period. (b) in FIG. 2 shows the amplitude waveform (envelope waveform) 9–9' of the read-out sensor output in the case where the read-out sensor position is on the upper side with respect to the average position 8 as viewed in the diagram (a). Likewise, (c) in FIG. 2 illustrates the case where the read-out sensor position lies on the lower side in the diagram (a). In the case where the read-out sensor position coincides with the average position 8, the distance between the read-out sensor and the center of the track remains unchanged throughout the video signal period and the synchronizing signal period, and hence, also the amplitude of the read-out sensor output becomes constant. As stated above, the phase of the amplitude waveform of the read-out sensor output is inverted depending upon the side on which the read-out sensor position lies with respect to the average position 8. Accordingly, the envelope waveform is derived from the read-out sensor output. Further, with the synchronizing signal to go upon, a reference signal having the same period as that of the synchronizing signal is generated. By synchronously rectifying the envelope waveform with the reference signal, a signal of a sign corresponding to the read-out sensor position is obtained. This signal can be made a control signal for causing the read-out sensor to follow the information track. According to this method, when the position of the read-out sensor coincides with the average position 8, the control signal becomes zero, and hence, the read-out sensor is controlled with the average position 8 as a tracking target. Accordingly, the read-out sensor does not track the center line 5 of the track part of the video signal period but tracks the somewhat offset position 8. This leads to the disadvantage that the read-out sensor output cannot be maximized.

Figure 3:
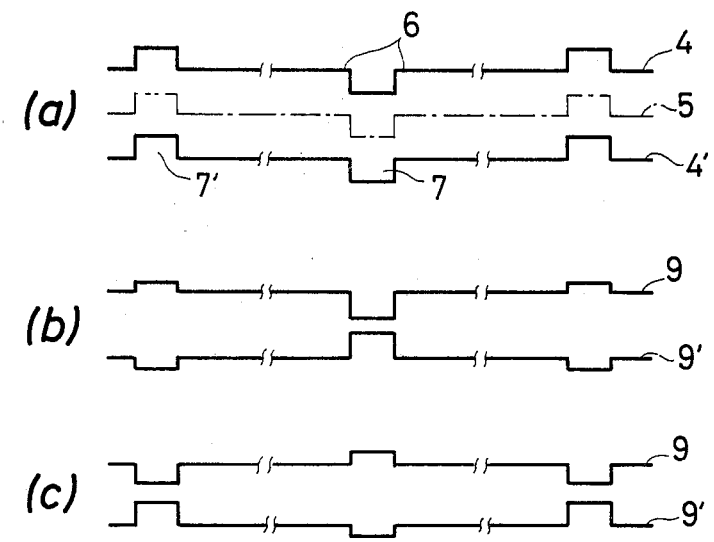

Now, the prior-art example illustrated in FIG. 3 has for its object to make improvements to avoid the disadvantage of the above example and to cause the read-out sensor to track the center of the track part of the video signal period. (a) in FIG. 3 is a diagram showing the shape of an information track. A point of difference from the first example of FIG. 2 is that the offset to be bestowed on the horizontal synchronizing signal period is made to have an opposite sense for every horizontal synchronizing signal period with respect to the preceding period. (b) in FIG. 3 illustrates an amplitude waveform of a read-out sensor output in the case where the read-out sensor lies near the center of a part 7' in the diagram (a), while (c) in FIG. 3 illustrates an amplitude waveform of a read-out sensor output in the case where the read-out sensor lies near the center of a part 7 (a synchronizing signal next to the horizontal synchronizing signal indicated by 7'). Depending upon which side of the track center 5 the read-out sensor lies on, either of the inverse-phase amplitude waveforms shown in (b) and (c) of FIG. 3 is obtained. Therefore, by combining it with appropriate means for generating a reference signal, a position control signal for the sensor is obtainable. This method bestows the opposite offsets alternately every adjacent horizontal synchronizing signal period, whereby at the balancing position of the sensor, the sensor undergoes the control of rocking (hereinbelow, termed "wobbling") sidewardly of the track at the same cycle as that of the offsets (two horizontal synchronizing signal periods correspond to one cycle). Assuming that the offset amounts are equal on both the sides, the balancing position comes to the center 5 of the track, and the present example is more advantageous than the previous example in this respect. As to the reference signal, an information which serves as a key for determining the phase thereof needs to be provided on the recording medium in order to determine whether waveforms (b) or (c) are being detected. The synchronizing signals, however, cannot be utilized in the system of FIG. 3 because the wobblings for the track are given in the opposite senses alternately every adjacent horizontal synchronizing signal period. It is therefore necessary to add a wobbling signal modulated by a frequency outside the band of the video signals to the video signals to form a composite signal and this composite signal is recorded and reproduced with a single information track, or the composite signal is reproduced by a separate read-out sensor from a reference signal reproducing track separately disposed on the recording medium in advance.

Figure 4:
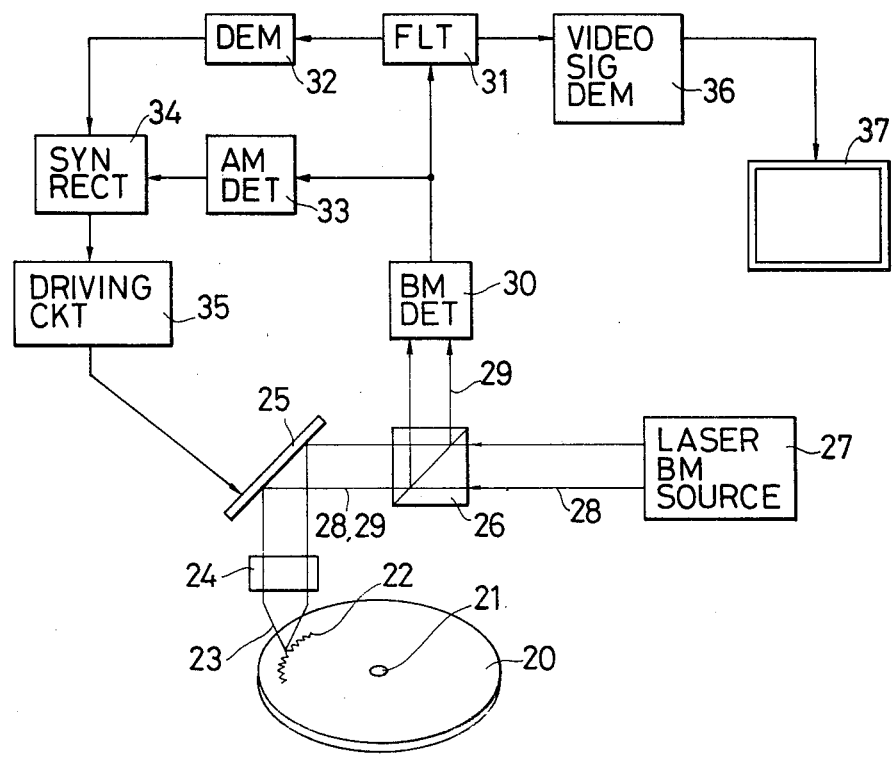
FIG. 4 is a block diagram of an information playback apparatus which is based on the method illustrated in FIG. 3.

FIG. 4 shows a prior-art example of a playback system for recorded information in which, according to the expedient as described above, wobblings are alternately given in a direction orthogonal to the direction of the track and wobbling signals modulated by a frequency outside the band of video signals are added to the video signals as a reference signal to form a composite FM signal.

Referring to FIG. 4, numeral 20 designates a disk type recording medium, numeral 21 the center axis of the recording medium 20, numeral 22 an information track on the recording medium, numeral 23 a beam spot incident on the information track 22, numeral 24 an optical system for converging the beam 23, numeral 25 a reflection mirror, numeral 26 a beam splitter, numeral 27 a laser beam source, numeral 28 an emitted laser beam, numeral 29 a reflection beam, numeral 30 a beam detector, numeral 31 a filter, numeral 32 a demodulator, numeral 33 an AM detector, numeral 34 a synchronous rectifier, numeral 35 a driving circuit, numeral 36 a video signal demodulator, and numeral 37 a monitor.

With such a construction, in order to reproduce information from the information track 22 recorded on the recording medium 20, the recording medium 20 is rotated around the center axis 21 at the same angular frequency as that at the recording. On the other hand, the light beam 28 emergent from the laser beam source 27 is reflected by the mirror 25 through the beam splitter 26, and the reflected beam is converged to a fine beam through the optical system 24 and caused to fall on the information track as the beam spot 23. The reflected beam 29 from the information track is an intermittent beam subjected to the same FM modulation as the recorded composite FM signal, and its envelope undergoes variations corresponding to the wobbling amounts in the lateral direction of the track. The reflected beam 29 reaches the beam splitter 26 via the optical system 24 as well as the reflector 25, and here, it is diverted to be applied to the beam detector 30. An output of the beam detector 30 is the composite FM signal, the amplitude of the envelope of which is varied by the offsets in the lateral direction as given to the track. The FM signal is separated into the video signals and the offset signals by the filter 31. The video signals are sent to the video signal demodulator 36, and are reproduced as an image by the monitor 37. On the other hand, the wobbling information (offset signals) are demodulated by the demodulator 32 into the wobbling signals or reference signals bestowed on the track at the time of recording. Further, the output of the beam detector 30 is applied to the AM detector 33 to derive an envelope signal. Using the reference signals from the demodulator 32, the envelope signal is synchronously rectified by the synchronous rectifier 34. Since the output of the synchronous rectifier 34 corresponds to the positional deviation of the read-out sensor from the center of the track, the position of the read-out sensor (in this example, the light beam spot 23) can be caused to follow the information track by amplifying the output with the driving circuit 35 and driving the reflector 25 in the direction of lessening the positional deviation. According to the system illustrated in FIGS. 3 and 4, in order to obtain the reference signal, the wobbling information for the reference signal needs to be added in the recording to the information originally aimed at. The density of all the information in the recording medium is therefore raised to that extent. As a result, the service conditions of the recording medium, that is, the precision conditions of the optical system and the beam detector of the playback apparatus become more severe. Besides, a demodulator circuit for the reference signal is required. These are factors which increase the cost of the playback apparatus.

DETAILED DESCRIPTION OF THE PREFERRED EMBODIMENTS

Figure 5:
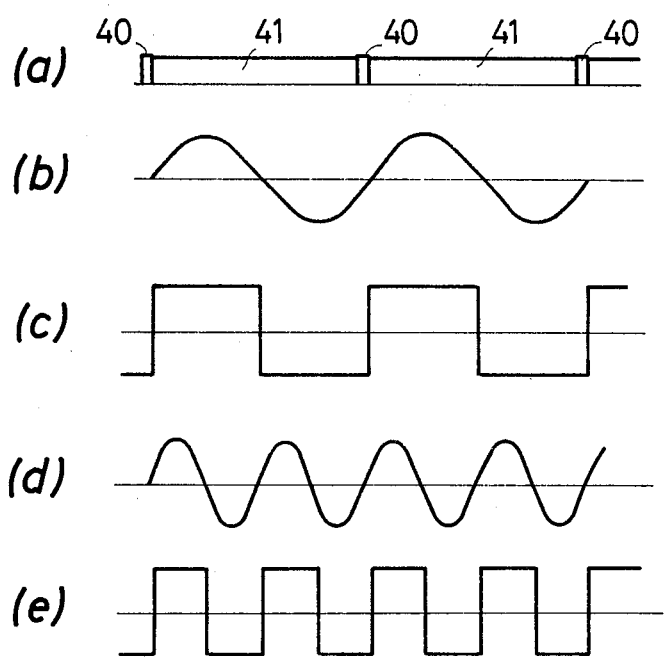
FIGS. 5(a)–(e) and 6(a)–(d) are explanatory diagrams of an embodiment of a method for recording and reproducing information according to this invention.

FIG. 5 shows diagrams for explaining an embodiment of a method for recording and reproducing information according to this invention.

(a) in FIG. 5 shows the array of information in an information track on a recording medium. Information 41 such as video signals and audio signals are arrayed alternately with synchronizing signals 40 which are arranged at equal time intervals.

(b) and (d) in FIG. 5 show wobbling signals which serve to rock the information track in a direction orthogonal to the lengthwise direction thereof in accordance with this invention during the recording of the information. The wobbling signal is a sinusoidal signal which is synchronized with the synchronizing signals 40 and which has a frequency which is N (N: positive integer) times higher than the frequency of the synchronizing signals. (b) in FIG. 5 corresponds to a case of N=1, while (d) in FIG. 5 corresponds to a case of N=2. Further, (c) and (e) in FIG. 5 show reference signals of the same frequencies and the same phases as those of the wobbling signals illustrated in (b) and (d) in FIG. 5, respectively. By synchronously rectifying a reproduced output with the reference signal, a read-out sensor can track the center of the information track.

Figure 6:
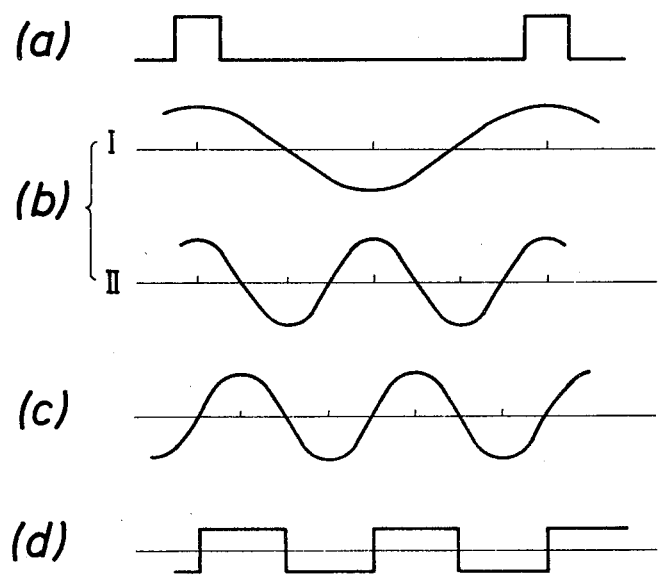

A pulse train obtained by reading out the information track as shown in (a) of FIG. 5 is a pulse train in which the synchronizing signals 40 are arrayed at equal time intervals as illustrated in (a) of FIG. 6 and which is expanded into a Fourier series. I and II in (b) of FIG. 6 illustrate fundamental wave and second-order higher harmonic wave components in the case where the synchronizing signals are expanded into a Fourier series, respectively. In accordance with this invention, as described above, the frequency of the wobbling signals is selected to be an integral number times the recurrence frequency of the synchronizing signals. Therefore, the wobbling signal frequency agrees with the frequency of any harmonics component of the pulse train of the Fourier-expanded synchronizing signals [(a) in FIG. 6], for example, the frequency of the component I or II in (b) of FIG. 6.

Accordingly, the envelope waveform of a read-out sensor output includes, besides the wobbling frequency component, the synchronizing signal harmonics component whose frequency agrees with the frequency of the former. In order to sample the desired wobbling frequency component from the envelope waveform and to subject this signal component to synchronous rectification (or multiplication detection) with the reference signals so as to obtain a tracking control signal, it becomes a requisite to remove the harmonics component of the synchronizing signals and to provide only the variation based on the wobbling as an effective output.

In order to fulfill this condition, in the embodiment of the present invention, the synchronous rectification is conducted with the reference signals which are in a phasic relation intersecting orthogonally with the harmonics component of the synchronizing signals, i.e., are different in phase by 90° from a harmonic component of the synchronizing signals, as seen in (c) of FIG. 6, whereby the harmonics component of the synchronizing signals is canceled. Simultaneously therewith, the wobbling signals are used which have a phase relation producing the synchronous rectification output of the wobbling frequency component efficiently with the reference signals (the inphase relation being the best).

Assuming by way of example that the wobbling frequency is equal to the frequency of the second-order higher harmonics component (II in (b) of FIG. 6) based on the synchronizing signals shown in (a) of FIG. 6, signals whose phase difference relative to the harmonic wave component II in (b) of FIG. 6 is 90° as illustrated in (d) of FIG. 6 are used as the reference signals for the synchronous rectification. Thus, when the harmonics component indicated at II in (b) of FIG. 6 is synchronously rectified with the reference signals in (d) of FIG. 6, the mean value of the resultant output becomes zero, so that the harmonics component is exempted from the tracking signal.

(c) of FIG. 6 shows the wobbling signal, which is a sinusoidal signal having the same frequency and phase as those of the reference signal illustrated in (d) of FIG. 6. The phase of the envelope variation waveform of the sensor output at the time when the information of the information track wobbled by this wobbling signal have been read out by the read-out sensor becomes either the same phase as in (c) of FIG. 6 or the opposite phase in dependence upon the side on which the read-out sensor lies with respect to the center of the information track. Moreover, the amplitude becomes smaller as the sensor comes closer to the center of the track. Therefore, the output obtained by synchronously rectifying the envelope variation waveform with the reference signal in (d) of FIG. 6 can be used as the desired control signal for the read-out sensor position.

Figure 7:
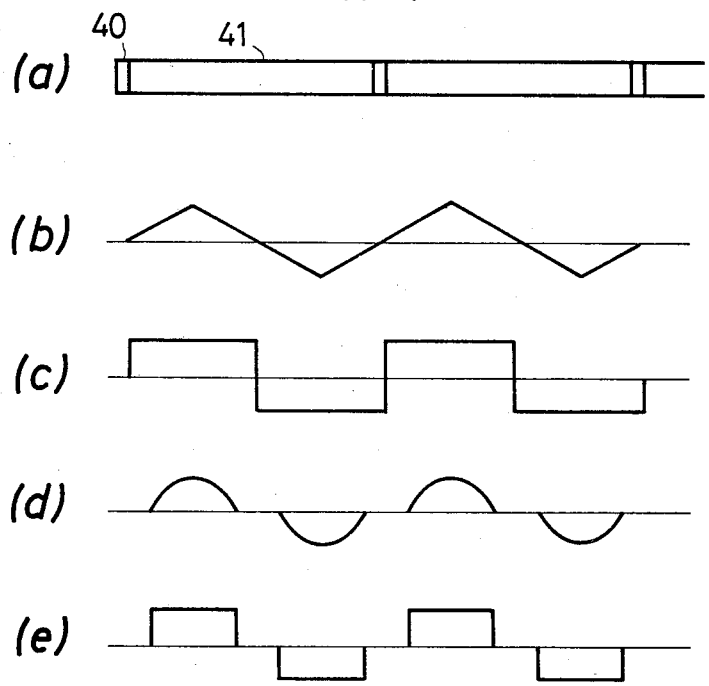
FIGS. 7(a)–(e), is an explanatory diagram of another embodiment of the method for recording and reproducing information according to this invention.

FIG. 7 shows the waveform of another embodiment of a wobbling signal for use in this invention. It employs instead of the sinusoidal signal shown in (b) of FIG. 5.

(a) of FIG. 7 illustrates the array of information of an information track. (b)-(e) of FIG. 7 illustrate examples of the waveform of the wobbling signal corresponding to (a) of FIG. 7, and the examples correspond to a case of N=1. N may well be 2 or more.

In the examples of (b) and (c) in FIG. 7, a triangular wave signal and a rectangular wave signal are respectively used as the wobbling signals. In the examples of (d) and (e) in FIG. 7, a sinusoidal wave signal and a rectangular wave signal which vary in both directions intermittently and alternately are respectively used as the wobbling signals. In the cases of (d) and (e) in FIG. 7, it is more desirable to shorten to the utmost the parts in which the signals do not change. The wobbling signal which lies in the phase and frequency relations with the synchronizing signals as above described can be readily generated by a phase-locked or pulled-in oscillator or the like.

Figure 8:
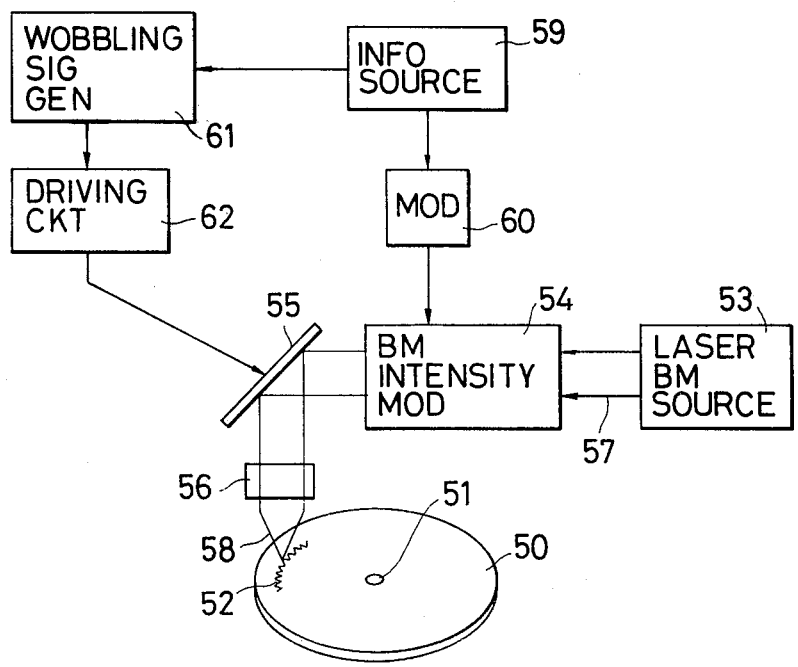

FIG. 8 shows the construction of an embodiment of an information recording apparatus which performs the information recording according to this invention as stated above. Numeral 50 designates a disk type recording medium, numeral 51 the center axis of the recording medium 50, numeral 52 an information track on the recording medium 50, numeral 53 a laser beam source, numeral 54 a beam intensity modulator, numeral 55 a reflection mirror, numeral 56 an optical system, numeral 57 a light beam, numeral 58 a beam spot, numeral 59 an information source, numeral 60 a modulator, numeral 61 a wobbling signal generator, and numeral 62 a driving circuit.

In this construction, the recording medium 50 is rotated at a predetermined speed around the axis 51. Simultaneously, the light beam 57 from the laser beam source 53 falls on the recording medium 20 as the beam spot 58 through the beam intensity modulator 54, the reflector 55 and the optical system 56. Thus, the information track 52 is formed.

On the other hand, a signal train which is received from the information source 59 and which consists of synchronizing signals and information such as video signals and audio signals is modulated by the modulator 60 and then applied to the beam intensity modulator 54. In the modulator 54, the beam intensity of the beam light 57 is modulated by the signal from the modulator 60.

In the wobbling signal generator 61, the wobbling signal is generated according to the foregoing procedure by the use of the synchronizing signals from the information source 59. It is applied to the reflector 55 through the driver circuit 62, to adjust the deflection angle thereof.

Accordingly, the information track 52 on the recording medium 50 is wobbled in correspondence with the wobbling signal in the direction orthogonal to the lengthwise direction of the track (the radial direction of the disk). Only the information signals and the synchronizing signals are recorded in the information track 52.

FIG. 9 shows the construction of an embodiment of information playback apparatus for reproducing the information thus recorded in the information track on the recording medium.

Referring to the figure, numeral 70 designates a circuit for reproducing clock signals and separating synchronous signals, numeral 71 a counter, numeral 72 the synchronizing signal, and numeral 73 the reproduced clock signal. The other numerals 20–30 and 33–37 correspond to the same numerals as in FIG. 4, and the operations of the components are identical, so that the explanation is omitted here.

The output of the beam detector 30 is transmitted to the AM detector 33, the demodulator 36 and the clock signal-reproducing and synchronizing signal-separating circuit 70. The clock signal 73 and the synchronizing signal 72 which are information reproduced in the circuit 70 are transmitted to the demodulator 36, to reproduce the original signal. The counter 71 is reset by the synchronizing signal 72, and divides and lowers the frequency of the reproduced clock signal 73. Thus, a reference signal having the same frequency and phase as those of the wobbling signal (for example, (c) or (e) in FIG. 5) 78 is obtained. Using this reference signal, an envelope signal provided from the AM detector 33 is synchronously rectified. The resultant signal is employed for the mirror drive.

FIG. 10 shows another example of a circuit for obtaining the reference signal. In order to obtain the reference signal, instead of dividing the frequency of the clock signals 73 by means of the counter 71, a phase-locked loop which is locked by the synchronizing signal 72 is used. Referring to FIG. 10, the synchronizing signal 72 is applied to one input of a phase comparator 74 of the phase-locked loop. The output of the comparator is passed through a filter 75 and then applied to a voltage-controlled oscillator 76. The output of the oscillator is divided by a counter 77 and then applied to the other input of the phase comparator 74. Supposing that the frequency is divided into 1/N by means of the counter 77, the frequency of the oscillator output 78 becomes N times higher than that of the synchronizing signals, and a signal having the same frequency as that of the wobbling signal is obtained. In the present embodiment, the counter may be a mere binary counter by selecting $N=2^n$ (n: zero or a positive integer). As N is made greater, the ripple frequency of the synchronous rectifier 34 increases more, and the ripple removal is easier.

As apparent from the contents of the embodiments described above, this invention is greatly effective as follows. (1) Any information for reproducing the reference signal need not be added to the original information signal. Accordingly, the clock signal of the original information signal is stabilized, and the margin at the reproduction of the clock signal is not spoiled, so that a stable playback of information can be carried out. (2) Since any information for reproducing the reference signal is unnecessary, the information density of the recording medium does not increase. It is accordingly evident that the service conditions of the recording medium become more severe. (3) Likewise, it is evident that the band of the read-out signals widens. Margins are therefore afforded to the performances of the optical system and the electric signal system. This serves to render the cost of the playback apparatus low. (4) On the playback apparatus side, the reference signal can be generated by utilizing the synchronizing signal designed at the highest stability. It is therefore possible to readily secure a stable tracking, in turn, a stable read-out. (5) Since the track is wobbled in equal amounts on the right and left sides of the track, the read-out sensor is controlled with the center of the track as the target.

In the foregoing examples, description has been made of the case where the information is optically recorded on the recording medium and where they are reproduced similarly optically. Needless to say, however, this invention is generally applicable to information recording and playback wherein information is recorded on recording media by various means and wherein it is reproduced in the non-contact state.

The recording medium is not restricted to the disk type, but it may be a tape, etc., as well.

Further, the waveform of the wobbling signal is not restricted to the foregoing examples, but various other shapes are also considered. Essentially, any may be used insofar as the fundamental frequency of the wobbling is an integral number times the frequency of the synchronizing signals.

Further, the recording and playback apparatuses for realizing the method according to this invention are not restricted to the foregoing examples, but other known apparatuses can be used.

We claim:

1. A method for recording and reproducing an information train in which synchronizing signals are arrayed at predetermined time intervals between the information to be reproduced, comprising the steps of recording said information train in an information track on a recording medium; while recording, wobbling said information track at a frequency which is an integral number of times the recurrence frequency of said synchronizing signals and is different in phase by 90° from a harmonic component of said synchronizing signals; reading out by means of read-out means said information train recorded in said information track; and controlling the position of said read-out means relative to said information track on the basis of the information train read out.

2. A method for recording and reproducing information as defined in claim 1, wherein said controlling step comprises separating the synchronizing signals from said information train read out; generating a reference signal which has the same frequency and the same phase as that of the wobbling waveform of said information track, on the basis of the separated synchronizing signals; generating an envelope waveform signal of the information train from said read-out means; synchronously rectifying the envelope waveform signal with the reference signal to produce a tracking control signal; and controlling the position of said read-out means relative to said information track by the use of said tracking control signal.

3. A method for recording and reproducing information as defined in claim 1 or claim 2, wherein the wobbling waveform of said information track is sinusoidal.

4. A device for reproducing from a recording medium having an information track an information train with synchronizing signals arrayed at predetermined time intervals between the information to be reproduced, which information has been recorded while wobbling the information track at a frequency which is an integral number of times the recurrence frequency of said synchronizing signals and is different in phase by 90° from a harmonic component of said synchronizing signals, comprising read-out means for reading out said information train recorded in said information track; separation means for separating the synchronizing signals from said information train obtained by said read-out means; first generation means for generating a reference signal which has the same frequency and the same phase as those of the wobbling waveform of said information track, on the basis of the synchronizing signals separated by said separation means; second generation means for generating an envelope waveform signal of the information train from said read-out means; rectification means for synchronously rectifying the envelope waveform signal from said second generation means with the reference signal from said first generation means; and means for controlling the position of said read-out means with an output of said rectification means.

5. A device for reproducing information as defined in claim 4, wherein said separation means includes means for producing clock pulses and for separating the synchronizing signals from the information train, and said first generating means includes count means for counting clock pulses in correspondence with the synchronizing signals to generate a reference signal.

6. A device for reproducing information as defined in claim 4, wherein said first generation means comprises a phase-locked loop circuit which generates said reference signal on the basis of the synchronizing signals from said separation means.

7. An information record comprising a recording medium having an information track in which there is recorded an information train including synchronizing signals which are arrayed at predetermined time intervals between information to be recorded, said information track wobbling at a frequency which is an integral number times the recurrence frequency of said synchronizing signals and is different in phase by 90° from a harmonic component of said synchronizing signals.

8. An information record as defined in claim 7, wherein the wobbling waveform of said information track is sinusoidal.

9. Information recording apparatus comprising input means for providing a signal representing an information train in which synchronizing signals are arrayed at predetermined time intervals between information to be recorded; first generation means for generating a beam of light; modulation means for modulating the intensity of the beam of light from said first generation means on the basis of the information train from said input means; second generation means for generating a signal corresponding to a selected wobbling frequency which is an integral number times the recurrence frequency of said synchronizing signals and is different in phase by 90° from a harmonic component of said synchronizing signals; and recording means for deflecting the beam of light from said modulation means in correspondence with the signal obtained by said second generation means and for projecting the deflected beam light onto a recording medium, to wobble said information train at said wobbling frequency and record it on said recording medium.

10. A method for recording an information train in which synchronizing signals are arrayed at predetermined time intervals between the information to be reproduced, comprising the steps of recording said information train in an information track on a recording medium; and, while recording, wobbling said information track at a frequency which is an integral number times the recurrence frequency of said synchronizing signals and a phase which is different by 90° from a harmonic component of said synchronizing signals.

* * * * *